United States Patent [19]

Yuzuriha et al.

[11] Patent Number: 4,771,720
[45] Date of Patent: Sep. 20, 1988

[54] CONSTRUCTION OF JOINT PORTION OF SEMI-SUBMERGED MARINE STRUCTURE

[75] Inventors: Yoshiyuki Yuzuriha, Yokohama; Noriharu Maeda, Yachiyo; Taiji Inui, Yokohama, all of Japan

[73] Assignee: Mitsui Engineering & Shipbuilding Co., Ltd., Tokyo, Japan

[21] Appl. No.: 905,377
[22] PCT Filed: Dec. 25, 1985
[86] PCT No.: PCT/JP85/00712
  § 371 Date: Aug. 26, 1986
  § 102(e) Date: Aug. 26, 1986
[87] PCT Pub. No.: WO86/03723
  PCT Pub. Date: Jul. 3, 1986

[30] Foreign Application Priority Data

Dec. 26, 1984 [JP] Japan ................. 59-196053

[51] Int. Cl.$^4$ ............................................. B63B 35/44
[52] U.S. Cl. .................................. 114/265; 403/237; 52/655
[58] Field of Search ............. 114/264, 265, 61; 405/195, 203, 204, 207, 208; 52/152, 655, 693, 695, 697; 403/230, 237, 244, 174, 178, 263

[56] References Cited

U.S. PATENT DOCUMENTS 3,485,050 12/1969 Martinovich ............... 405/195
3,841,249 10/1974 Vilian ............................ 114/265
4,646,672 3/1987 Bennett et al. ............. 114/265

FOREIGN PATENT DOCUMENTS 49-11916 3/1974 Japan.
59-223594 12/1984 Japan.

OTHER PUBLICATIONS

European Patent Application No. 0094156 Heerema, Nov. 1983.

Primary Examiner—Sherman D. Basinger
Assistant Examiner—Edwin L. Swinehart
Attorney, Agent, or Firm—Armstrong, Nikaido, Marmelstein & Kubovcik

[57] ABSTRACT

The construction of a joint portion between a column and a bracing in a semi-submerged marine structure which consists of a platform, a column, a submerged body and a bracing to which the column is joined. The bracing consists of a portion having a small cross-sectional area, a tapering portion the cross-sectional area of which increases gradually toward a free end of the bracing, and a free end portion having a larger cross-sectional area. In a joint portion between the column and bracing, the portion of the bracing which has a larger cross-sectional area is in the interior of the column. If the tapering portion of the bracing is welded to the outer plate of the column, the stress in the joint portion can be dispersed into the outer plate and the same portion of the bracing.

4 Claims, 5 Drawing Sheets

CONSTRUCTION OF JOINT PORTION OF SEMI-SUBMERGED MARINE STRUCTURE

FIELD OF ART

The present invention relates to a construction of a joint portion of a semi-submerged marine structure.

BACKGROUND ART

Semi-submerged marine structures generally have such a structure in which a plurality of columns having their respective upper portion projecting above water surface are built on each of a plurality of submerged bodies held in water and, while a platform is supported on and by all the columns, correspondingly located columns on respective submerged bodies are supported in pairs by bracings.

Then, according to the prior art, the bracing is secured with its portion having a larger cross-sectional area to the column in a manner such that a connection portion of the bracing at which the portion having a larger cross-sectional area and a tapering portion are connected to each other is disposed outside the column, so that the problem is encountered that stress concentrates at the connection portion to produce cracking therein.

The present invention aims at avoiding the concentration of stress at the connection portion in or of the bracings.

DISCLOSURE OF THE INVENTION

Thus, the present invention provides a construction of a joint portion in or of a semi-submerged marine structure in which a plurality of columns having their respective upper portion projecting above water surface are built on each of a plurality of submerged bodies held in water and, while a platform is supported on and by all the columns, correspondingly located columns on respective submerged bodies are supported in pairs by bracings, characterized in that a tapering portion the cross-sectional area of which increases gradually toward a forward end of the bracing, provided at an end of a portion of the bracing which has a smaller cross-sectional area, is secured to an outer plate of the column in a manner such that a connection portion of the tapering portion and a portion of the bracing having a larger cross-sectional area is disposed in the interior of the column.

Attributable to this construction, according to the present invention the concentration of stress in the connection portion at which the tapering portion and the portion having a larger cross-sectional area of the bracing are connected together can be avoided.

BEST MODE FOR THE CARRYING-OUT OF THE INVENTION

Generally, semi-submerged marine structures such as the one shown at 1 have such a structure in which a plurality of columns 3 having their respective upper portion projecting above a water surface W are built on each of a plurality of submerged bodies 2 held in water and, while a platform 4 is supported on and by all the columns 3, the correspondingly located columns 3 and 3 on the submerged bodies are supported in pairs by bracings 5.

Figure 14:
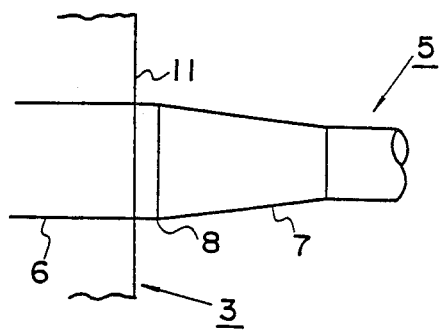
FIG. 14 shows a sectional view, taken on line A—A in FIG. 13.

Then, according to the prior art, as illustrated in FIG. 14 the bracing 5 is secured with its portion having a larger cross-sectional area, 6, to an outer plate 11 of the column 3 in a manner such that a connection portion 8 of the bracing 5 at which the portion having a larger cross-sectional area 6 and a tapering portion 7 are connected to each other is disposed outside the column 3, so that the problem is encountered that stress tends to concentrate at the connection portion 8 to produce cracking in this portion.

The present invention, which has for its object to cancel the above-indicated problem in the prior art, is possessed of the following structural features.

Figure 1:
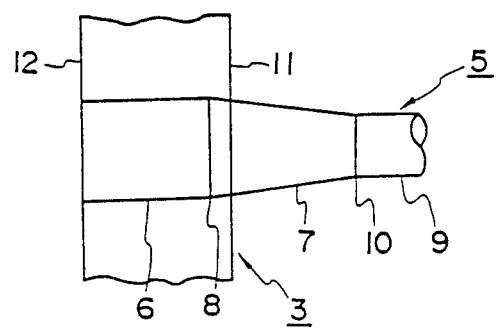
FIG. 1 is a plan view, partly in section, showing an example of the construction of a joint portion in or of a semi-submerged marine structure pertaining to the present invention.

FIG. 1 shows a construction of a joint portion in a semi-submerged marine structure according to the present invention, and as shown, the bracing 5 comprises a portion having a smaller cross-sectional area, 9, to an end of which is connected by welding an end of the tapering portion 7 the cross-sectional area of which increases gradually toward a forward end of the bracing 5, as in for example a frustum of a cone or of a pyramid, and the portion having a larger cross-sectional area 6, which is joined by welding to the other end of the tapering portion 7.

The tapering portion 7 is secured in a portion thereof to the outer plate 11 of the column 3 by welding, and a forward end of the portion having a larger cross-sectional area 6 is joined by welding to a partition wall 12 provided in the interior of the column 3.

According to the above structuring, the connection portion 8 at which connected to each other are the tapering portion 7 and the portion of a larger cross-sectional area 6 is located in the interior of the column 3, so that the stress from the side of the portion having a smaller cross-sectional area 6, if occurred, can be dispersed into the outer plate 11 and the portion of a larger cross-sectional area 6, whereby a stress concentration at the connection portion 8 can be avoided.

Further, the portion of a smaller cross-sectional area 9 and the tapering portion 7 of the bracing 5 are joined together at joining portion 10.

Figure 2:
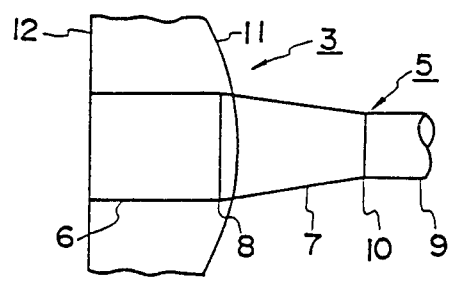
FIGS. 2 to 12 are plan views, partly in section, respectively showing another example of the construction of a joint portion in or of a semi-submerged marine structure pertaining to the present invention.

The above construction of the joint portion of the column 3 and the bracing 5 can be variously modified, and FIG. 2 shows such a modified example of the construction in which the outer plate 11 of the column 3 is curved to be outwardly convex.

Figure 3:
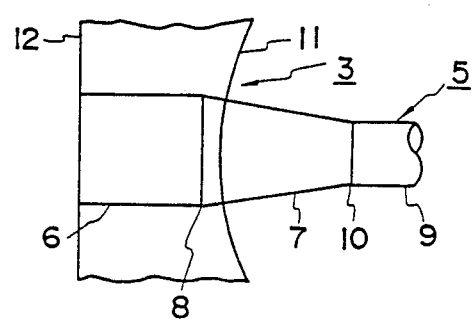
Figure 4:
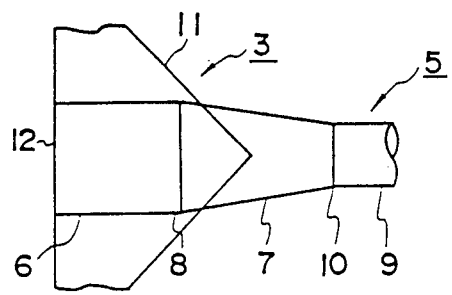
Figure 5:
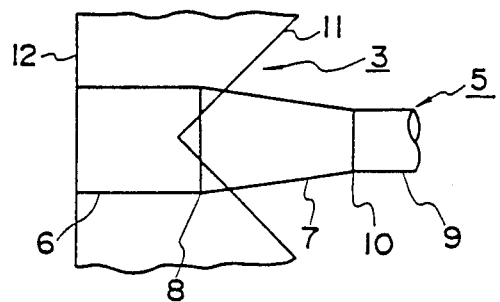
Figure 6:
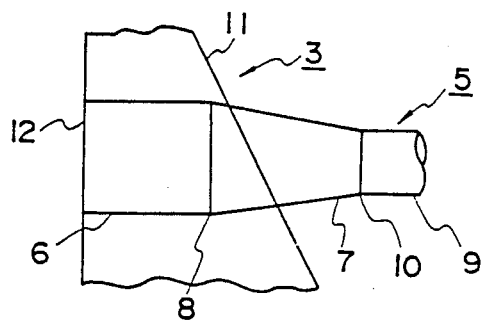

As shown in FIG. 3, further, the outer plate 11 of the column 3 may otherwise be so curved as to be convex toward the inside of the column. Otherwise, the outer plate 11 of the column 3 may be V-shaped so as to be outwardly convex as shown in FIG. 4 or to be convex toward the inside as shown in FIG. 5. The outer plate 11 may further otherwise be disposed at an inclination as shown in FIG. 6.

Figure 7:
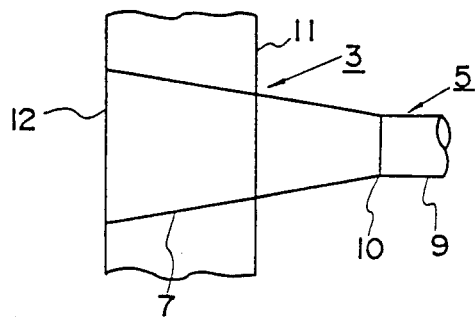
Figure 8:
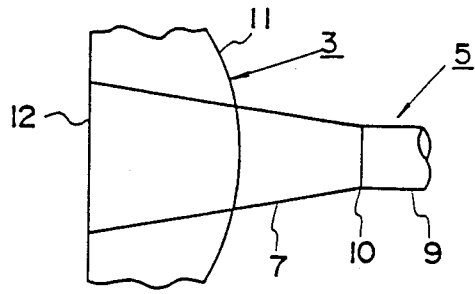

As shown in FIG. 7, further, it is also possible to make the bracing devoid of the portion having a larger cross-sectional area 6 and then secure the tapering portion 7 directly to the partition wall 12 inside the column 3. As shown in FIG. 8, further, it may be devised to make the bracing 5 devoid of the portion of a larger cross-sectional area 6 and secure the tapering portion 7 directly to the partition wall 12 within the column 3, and in addition, to curve the outer plate 11 of the column 3 so as to be outwardly convex.

Figure 9:
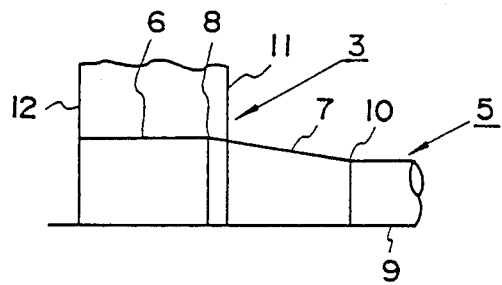

As shown in FIG. 9, further, the tapering portion 7 and the portion having a larger cross-sectional area 6 of the bracing 5 may be so made as to have a face which coincides with the generatrix of the portion having a smaller cross-sectional area 9.

Figure 10:
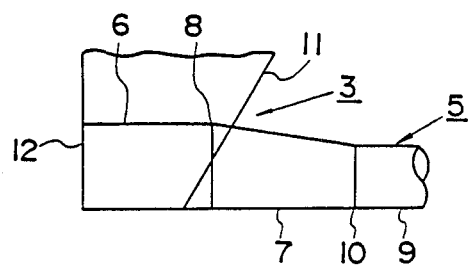

As shown in FIG. 10, further, it may be designed that the tapering portion 7 and the portion having a larger cross-sectional area 6 of the bracing 5 are made having a face which coincides with the generatrix of the portion having a smaller cross-sectional area 9 and that the outer plate 11 of the column is so shaped as to cross the portion having a larger cross-sectional area 6 and the tapering portion 7.

Figure 11:
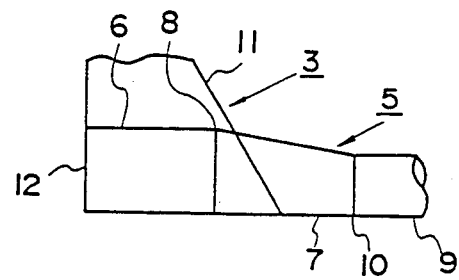

Further alternatively and as shown in FIG. 11, the tapering portion 7 and the portion having a larger cross-sectional area 6 of the bracing may be made having a face which coincides with the generatrix of the portion having a smaller cross-sectional area 9, and the outer plate 11 of the column 3 is arranged to obliquely traverse the tapering portion 7.

Figure 12:
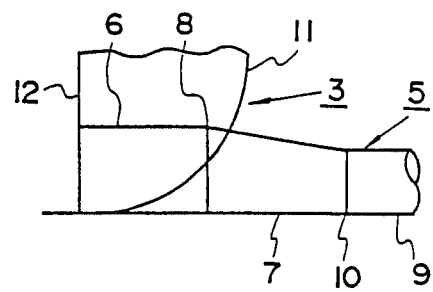
Figure 13:
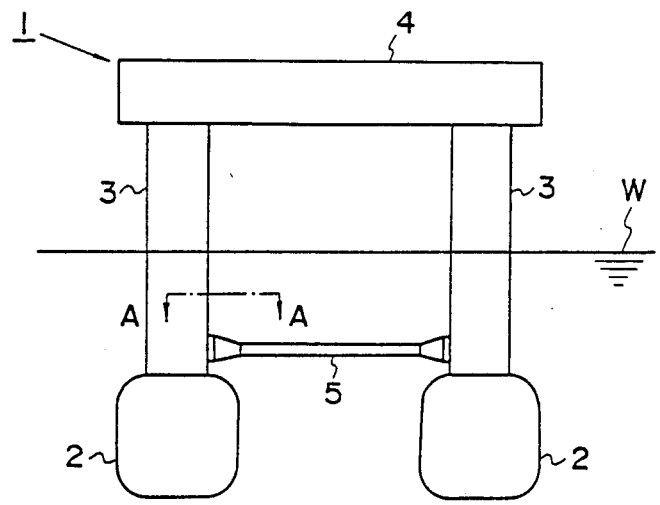
FIG. 13 shows a front view of a semi-submerged marine structure of the prior art.

Lastly, as shown in FIG. 12, it may further alternatively be made to curve the column 3 and arrange it to extend between the portion having a larger cross-sectional area 6 and the tapering portion 7.

We claim:

1. In a marine structure which includes a platform, a plurality of hollow columns extending downward from said platform and each having an outer member constituting an outer wall of said column and a substantially planar partition wall secured within and directly to said outer member, said partition wall extending generally longitudinally with respect to the axis of said column, and a bracing being adapted to connect adjacent two columns, each bracing comprising a middle portion of relatively small uniform cross-section and a pair of short tapered portions at both ends thereof, an outer end of each tapered portion being larger than an inner end thereof, wherein said outer end of each short tapered portion is secured to said partition wall within each column and an intermediate portion of each short tapered portion is welded to said outer member of said column.

2. A semi-submerged marine structure according to claim 1, wherein an end portion of relatively large uniform cross-section is welded between said end of each short tapered portion and said partition wall.

3. A semi-submerged marine structure according to claim 2, wherein said tapered portion has a frusto-conical configuration.

4. A semi-submerged marine structure according to claim 1, wherein each of said short tapered portions is welded directly to said partition wall.

* * * * *